Patented June 3, 1930

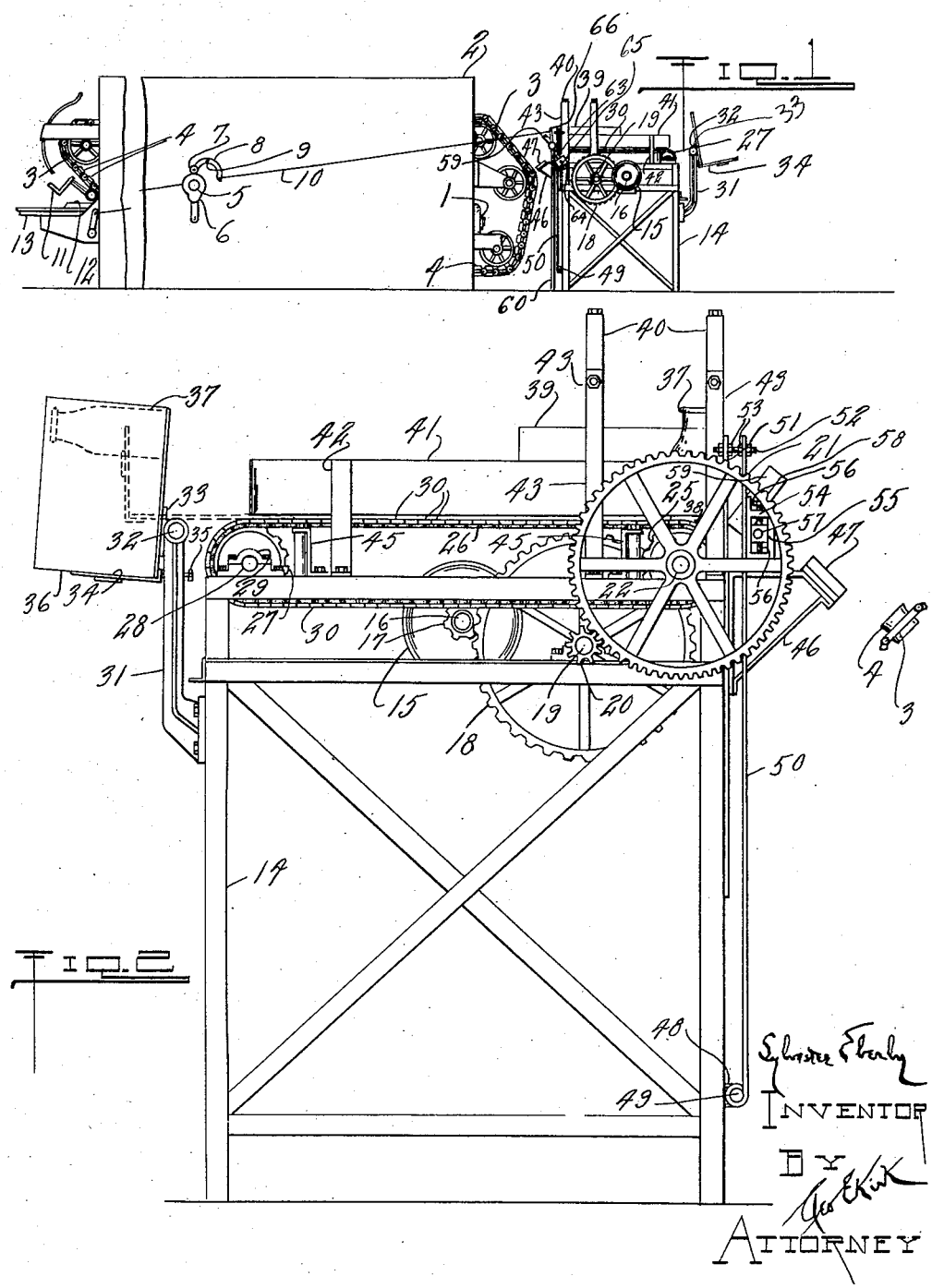

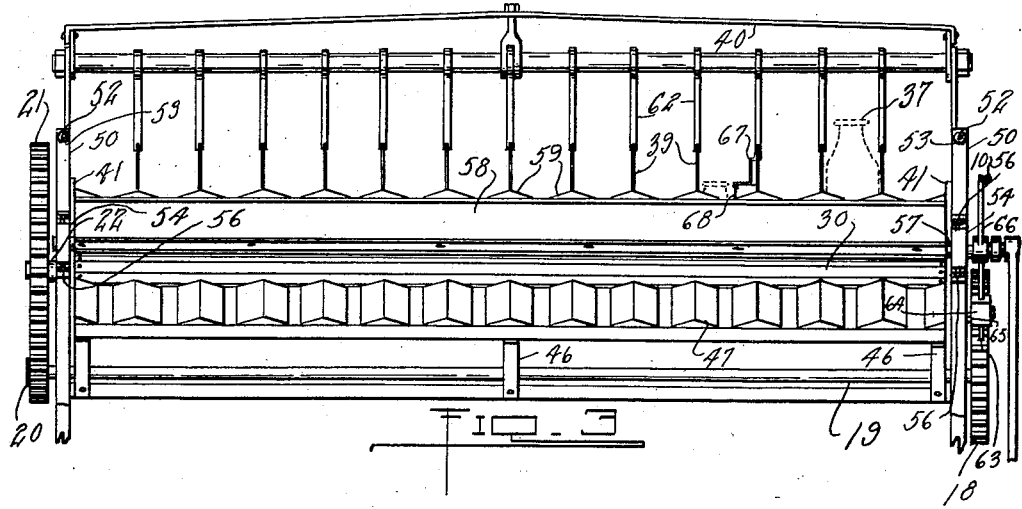
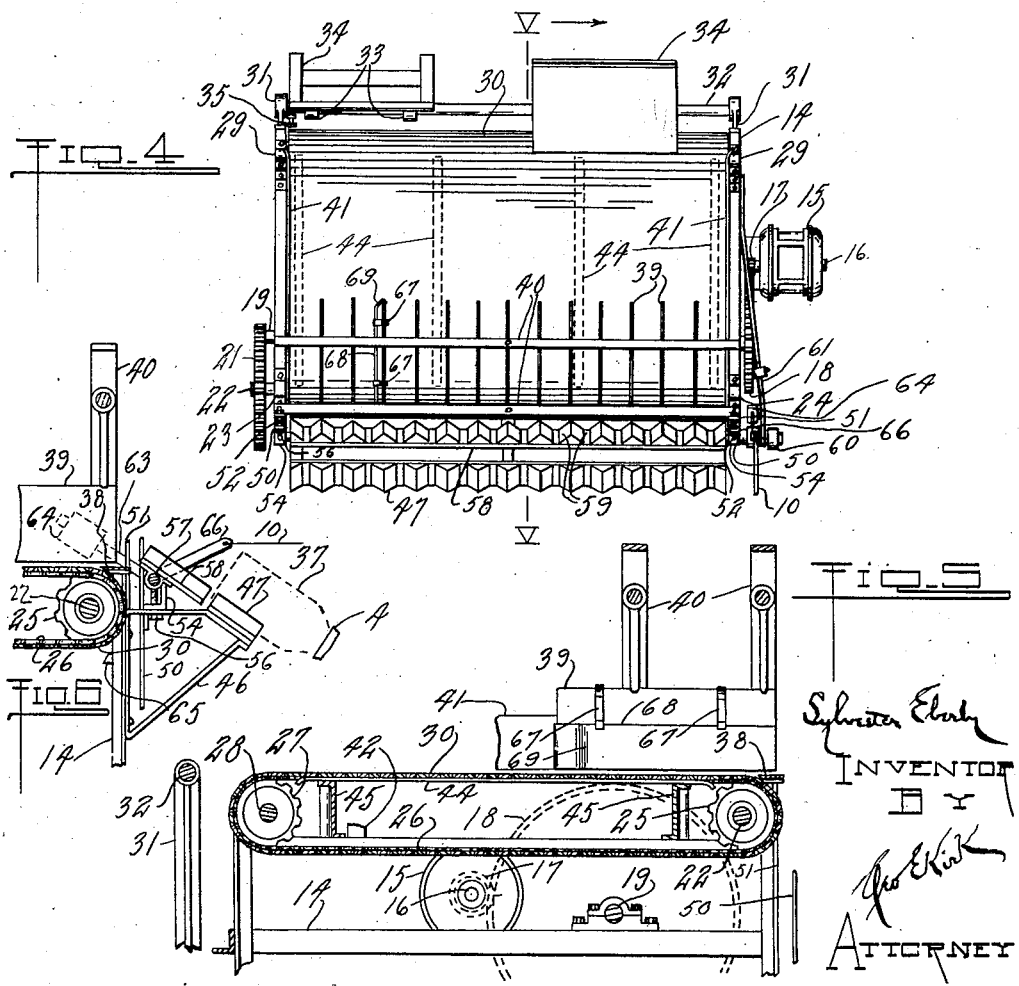

1,761,781

UNITED STATES PATENT OFFICE

SYLVESTER EBERLY, OF TOLEDO, OHIO, ASSIGNOR OF ONE-HALF TO KNUD FLENSTED, OF TOLEDO, OHIO

ARTICLE FEEDER

Application filed February 24, 1925. Serial No. 11,146.

This invention relates to delivery or transfer apparatus for articles.

This invention has utility when incorporated in feeders for washers, as in the delivery of milk bottles, beverage bottles, jars, glassware, etc.

Referring to the drawings:

Fig. 1 is a side elevation, with parts broken away, of an embodiment of the invention in connection with a washer;

Fig. 2 is a side elevation on an enlarged scale of the feeder at the opposite side from the showing in Fig. 1;

Fig. 3 is a fragmentary elevation of the delivery end of the feeder of Fig. 2;

Fig. 4 is a plan view of the feeder of Fig. 2;

Fig. 5 is a section on the line V—V, Fig. 4, and

Fig. 6 is a detail view of the chute control connection for discharge from the feeder with the parts in discharge position.

Motor 1 serves to operate washer 2 having endless conveyor 3 carrying sockets 4 into which milk bottles or jars may be inserted for passing through the washer, there to be scrubbed, scalded, washed, and rinsed. This washer 2 has rotary shaft 5 carrying cam 6 acting upon roller 7 to rock lever 8 mounted on fixed fulcrum 9. From this lever 8 extends link 10 herein shown as the connection for synchronizing the feed operation to the washer 2 with the intermissions in the driving of the conveyor 3. The discharge end of the machine shows let-down 11 and pusher 12 for the delivery of articles as washed upon a table 13.

The feeder proper comprises frame 14 carrying motor 15 having shaft 16 carrying pinion 17 in mesh with gear 18 on shaft 19 extending through the frame 14 to carry pinion 20 in mesh with gear wheel 21 on shaft 22 extending over the frame 14 and there fixedly mounted by bearings 23, 24. On this shaft 22 are sprocket wheels 25 coacting with sprocket chains 26 extending parallel to the top of the frame 14 to pass about sprocket wheels 27 on follower shaft 28 mounted by bearings 29 adjacent the receiving end of this feeder. These sprocket chains 26 carry slats 30 which form a flexible belt or endless conveyor.

The frame 14 adjacent the delivery end has upstanding brackets 31 carrying shaft 32. Loosely mounted on fulcrum or shaft 32 are brackets 33 carrying angular supports 34 as a case holder. The brackets 33 and angle support 34 are counter-balanced or so disposed as to the fulcrum 32 as to hang away from the conveyor 30, the drop position of which is determined by stops 35 from the frame 14.

On the support 34, case 36 may be placed carrying, say milk bottles 37, having the bottoms of such bottles in the top or discharge side of the case, so that as the case 36 is tilted against gravity toward the conveyor 30, the bottoms of the bottles 37 are toward the conveyor 30 and the case may be readily shifted from the support 36 upon the conveyor 30, and with the case lifted off such conveyor to have the bottles 37 top side up on this conveyor 30.

This conveyor 30 is continuously driven by the motor 15 to have its upper reach travel away from the support 34 toward narrow platform 38. In the travel of the bottles toward this platform 38, the bottles are divided into rows by partitions 39 suspended above the conveyor 30 and the platform 38 by bridge portions 40. These bottles 37 as sorted into rows by the partitions 39, as to the front row of such bottles, have such rest upon the platform 38 and overhang slightly therefrom away from the conyeyor 30. Besides the partitions 39 to guide the bottles in the intermediate region, there are marginal guide portions 41 holding the terminal bottles from shifting laterally off conveyor belt 30. These lateral guides 41 are supported by brackets 42 rising from the frame 14 and are also connected to supports 43 carrying the bridge portions 40. The conveyor belt 30 is sustained as to its upper reach by slides 44 carried by cross-bars 45.

Bracket 46 upwardly extends from the discharge end of the frame 14. Fixed slides 47 are engaged by the upper portion of the brackets 46. These slides 47 register with the stop or rest positions of sockets 4 of the endless conveyor chain 3 of the washer. These slides direct the row of bottles 37 into such sockets or seats 4.

U-bolts 48 lock member 49 (Fig. 2) with the frame 14. Mounted on this pivot bearing providing member 49 are upwardly extending straps 50. Fixed with the frame 14 and upwardly extending therefrom, adjacent the bridge supports 43, are brackets 51 from which extend bolts 52 permitting adjustment of the straps 50 toward and from the platform 38. As such straps are adjusted, nuts 53 on the bolts 52 hold the strap 50 against shifting. The straps 50 carry brackets 54 in which are bearings 55 adjustable by bolts 56. In the bearings 55 is shaft 57 having fixed therewith abutment 58 providing thereacross a series of chutes 59 in alignment with the ways between the partitions 39 and the series of guides 47.

The shaft 57 at the side of the frame 14 carrying the motor 15 is supported by post 60 (Fig. 1) from which extends strut 61 (Fig. 4) to the crossbar 45 adjacent the receiving end of the machine. The adjustment of the strap 50 toward and from the narrow platform 38 as affected by the bolts 52 and nuts 53, as well as the height adjustment for the shaft 57 by the bolts 56, allow of such nicety in control as to take care of various sizes and diameters of articles.

The partitions 39 extend upward to such distance that supports 62 (Fig. 3) from the bridges 40 have clearance against interfering with the swell portions of the articles 37.

Fast on this shaft 57 is arm 63 carrying adjustable counterweight 64 normally swingable to abut stop 65 thereby effective for holding the abutment 58 and its chute portions 59 in an upwardly inclined position impeding delivery by the conveyor 30 of articles from such conveyor farther than the position in which they rest upon the platform 38.

The shaft 57 carries additional arm 66 connected to the link 10 from the washer 2, so that in the periods of rest for the socket carrying conveyor 3 this link 10 is pulled to swing the abutment 58 on its shaft axis 54 from its upwardly inclined position to a downwardly inclined position. At an intermediate point of this downward swing, the row of articles on the platform 38 have their tops inclined forwardly and as the abutment 58 swings to a downward position, the bottles 37 which were top upward on the conveyor 30 have those tops slide downward over the slides 47 into the sockets 4. At this tilt position of the abutment for having the bottles slide thereover, the abutment holds the succeeding row of bottles upon the platform 38 so that but a single row of bottles is delivered into the row of sockets at a single tilting of the abutment 58. As the abutment 58 swings back to the upwardly inclined normal position of rest, the succeeding row of bottles delivered by the conveyor 30 between the partitions 39 rests upon the platform 38 in position for delivery at the succeeding tilt of the chute series or abutment.

In the structure of this disclosure, there is a device of flexibility for readily supplying rows of similar articles in a desired arranged grouping simultaneously. There is such latitude of adjustment as to take care of a range of sizes in a single machine. It is one simply connected for control in synchronism with the machine to which the articles are delivered.

While the spacing of the partitions 39 will take care of quite a range of sizes of articles, it may be desirable to have additional provision when articles rather narrow are to be handled. For instance, the partitions 39 may take care of milk bottles of quart and pint sizes and even one-half pint sizes. However, in the one-half pint sizes there is such a tendency in the crowding of the bottles as to cause them to stagger or crowd along somewhat out of straight line grouping which may in a degree affect the desired operation. To avoid this out of straight line grouping, the ways between the partitions are narrowed. This is done by thickening the partitions. Hooks 67 upon the partitions 39 carry auxiliary partitions 68 which have hook end 69 over the ends of the partitions 39 thereby giving greater effective thickness to the partitions in such a degree as to maintain the articles in a line.

What is claimed and it is desired to secure by United States Letters Patent is:

1. A delivery device embodying a conveyor, a platform to which conveyor carried articles are delivered, an abutment providing a chute holding conveyor-delivered articles upon the platform, and means for shifting the abutment discharge end downward to discharge platform carried articles in sequence.

2. A delivery device embodying a conveyor, a platform to which conveyor carried articles are delivered, a pivotally mounted abutment providing a chute holding conveyor delivered articles upon the platform, and means for rocking the abutment discharge end downward to discharge a platform-carried article while holding a succeeding article against discharge.

3. A delivery device having an abutment providing a chute, a pivotal mounting for the abutment, means for directing the chute discharge end upwardly for holding articles against delivery thereover, and means rocking the chute discharge end downwardly for permitting an article to slide thereover, said chute in said slide delivery position precluding receiving a succeeding article.

4. A feeder embodying an endless conveyor, a pivot bearing transversely of the conveyor, a tiltable chute mounted by the bearing and normally extending upwardly from the conveyor for holding articles from passing from the conveyor, a fixed guide beyond the conveyor, a receiver toward which the guide is directed, and means for rocking the chute to extend downwardly beyond the conveyor to direct an article from the conveyor over said guide to said receiver.

5. An article aligning delivery device embodying a conveyor, pivot bearings transversely of the conveyor, tiltable supply and delivery means for the conveyor extending transversely thereof and mounted in said bearings, one adjacent each end of the conveyor and extending in alignment therewith and therebeyond, and partitions intermediate the transverse extent of the conveyor and parallel to each other and the direction of article travel on the conveyor for re-aligning conveyor shifted articles in parallel rows to the delivery means.

6. A delivery device embodying a conveyor, a platform to which articles are delivered by said conveyor, an abutment holding articles from the conveyor on the platform, a pivotal mounting disposing the abutment to provide an intermediate receiving position, and means for rocking the abutment discharge end downward from an initial holding position to an intermediate receiving position and there holding an article on the platform, said means thereafter being shiftable to hold a succeeding article while discharging said received article.

In witness whereof I affix my signature.

SYLVESTER EBERLY.